United States Patent [19]
Gilgen

[11] 3,820,280
[45] June 28, 1974

[54] GARDEN INSTALLATION

[76] Inventor: Hans Gilgen, Parkstrasse 23, CH-4102 Binningen, Switzerland

[22] Filed: Nov. 28, 1972

[21] Appl. No.: 310,024

[30] Foreign Application Priority Data
Dec. 1, 1971  Switzerland.................. 17471/71

[52] U.S. Cl............................................ 47/38, 47/1
[51] Int. Cl............................................... A01g 9/00
[58] Field of Search.................... 47/1, 37–38.1, 47/56, 1.2

[56] References Cited
UNITED STATES PATENTS
2,343,010  2/1944  Hebert................................ 47/38
3,067,543  12/1962  Bracey................................ 47/38

FOREIGN PATENTS OR APPLICATIONS
6,602,933  9/1966  Netherlands
1,419,032  10/1965  France
1,275,324  8/1968  Germany
496,915  8/1954  Italy Primary Examiner—Robert E. Bagwill
Attorney, Agent, or Firm—Kurt Kelman

[57] ABSTRACT

A garden installation, especially a roof garden installation, comprises a bed defined by a border of hollow edging elements within which are disposed a separating layer, for example of plastics film, which separates the contents of the bed from an underlying support, for example a roof, a drainage layer, for example of expanded clay or aerated concrete, above the separating layer for regulating the watering of the bed, a filter element above the drainage layer and a layer of soil or other substrate material for receiving plants and/or seeds located above the filter element. The installation may have provision for semi-automatic or fully-automatic watering.

3 Claims, 3 Drawing Figures

GARDEN INSTALLATION

BACKGROUND OF THE INVENTION

This invention relates to a garden installation, in particular, but not exclusively, to a roof garden installation of relatively low weight.

In a garden installation where the soil or other material which is to receive seeds and/or plants (hereinafter referred to simply as "the substrate") must be supported by a load-bearing construction, or where the substrate is to be applied to an artificially produced base or is to be kept separate from a natural base (soil on which plants have grown), the weight of the substrate material becomes of considerable importance since, as the weight increases, the cost of the supporting construction, base or foundation increases.

An object of the present invention is therefore to provide a garden installation in which a substantial reduction in the depth of the substrate and hence a reduction of the total weight of the garden installation is possible.

THE INVENTION

According to the invention, a garden installation comprises a bed defined by a border of adjoining hollow edging elements, a separating layer which separates the contents of the bed from an underlying support, a drainage layer of water-storing material provided above the separating layer for regulating the watering of the bed, a filter element located above the drainage layer and a substrate located above the filter element.

The edging elements preferably are made of asbestos cement in the form of structural units of U-shaped cross-section, the open side of each unit, when assembled, facing the underlying support, whilst the limb of the unit which faces the contents of the bed is provided at its lower end, with a foot section which extends under the contents of the bed. The separating layer which divides the drainage layer from the underlying support is preferably a sealing film placed on said support, for example a rot-proof, root-repellant plastics film, such as PVC film, which in the region of the edging elements is drawn upwards against the limbs of the elements which face the contents of the bed.

The drainage layer which regulates the watering appropriately consists of porous material suitable for the storage of water and may consist of granular expanded clay or of an open-pore aerated concrete layer, preferably formed of individual sheets.

The filter element, which is intended to prevent the substrate material from penetrating into the drainage layer, is preferably a filter mat consisting of open-pore, rot-proof polyurethane foam, above which the water rising from the drainage layer is released into the substrate.

In a semi-automatically or fully-automatically operating garden installation the drainage layer is appropriately connected to a device for restricting the water level, for example a standpipe which is adjustable in height and through which excess water is passed to a drain. Fully-automatic installations are furthermore equipped with means, advantageously incorporated in the same device, for supplying water to the drainage layer. This lastmentioned means may incorporate, for example, a float-controlled inlet valve.

An embodiment of a garden installation in accordance with the invention will now be described, by way of example with reference to the accompanying drawing.

DESCRIPTION OF A PREFERRED EMBODIMENT OF THE INVENTION

Figure 1:
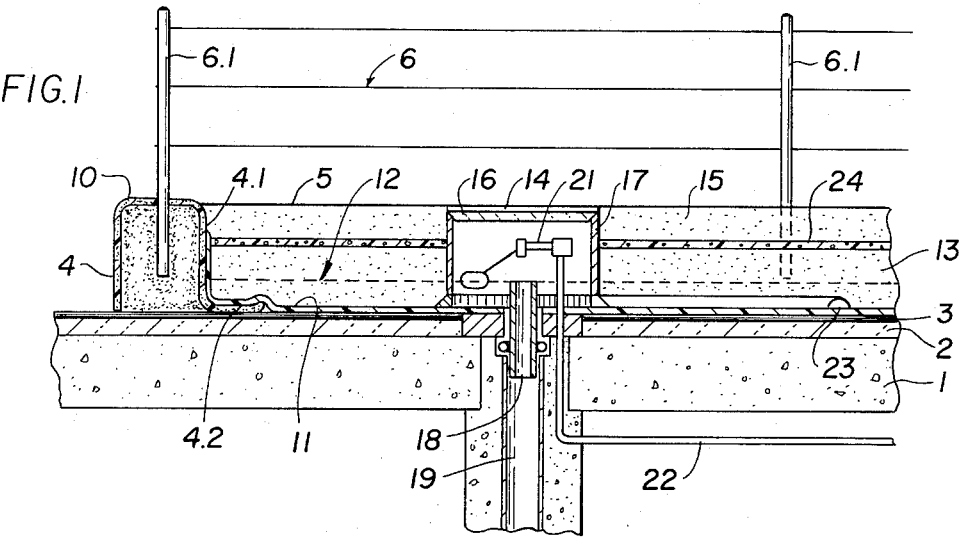
FIG. 1 is a partial cross-sectional view of the installation.
Figure 3:
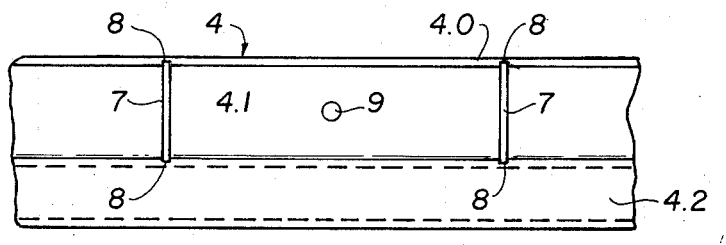
FIG. 3 is an underside plan of part of an edging element of the installation of FIG. 1.

In FIG. 1, the numeral 1 designates the concrete cover of a flat roof provided with an insulating layer 2 and a roof covering 3. (The roof covering can, for example, also be covered over with a layer of protective mortar). The numerical 4 designates an edging element in the shape of an inverted U, of which the limb 4.1 which faces the bed 5 is provided with a foot section 4.2 which extends under the contents of the bed. This foot section serves in particular to improve the adhesion and stability of the edging element on the underlying support, in the present instance on the roof covering 3 (or the layer of protective mortar). Edging elements of the cross-section shown, and of approximately one metre in length, made of asbestos cement or other material of similar weight, normally do not require any further fixing or anchoring element in order to avoid undesired shifting on their support. The edging elements which can be used not only as a border for the bed but also as step elements, as seats or as carriers for a balustrade 6 can, as shown in FIG. 3, be provided with transverse stiffening or dividing partitions 7 which can be inserted between the legs. Guide grooves 8 are provided on the insides of the limbs 4.0 and 4.1 of the U, to receive the said partitions. The transverse stiffening or dividing partitions 7 can also serve to delimit edging element sections which can be filled with mortar in order further to increase the stability of the element or to fix or hold balustrade posts 6.1. If desired, mortar can also be introduced through holes 9 in the top connecting strip 10 between the limbs 4.0 and 4.1 of the U, and these holes can again serve to receive the balustrade posts 6.1.

Figure 2:
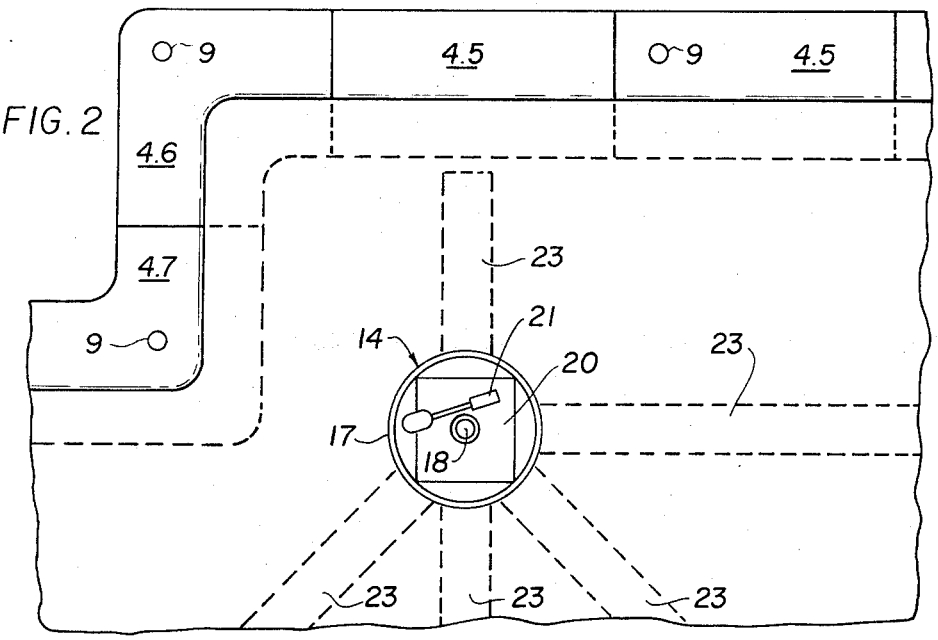
FIG. 2 is a plan of part of the installation of FIG. 1 showing a device for restricting the water level and for supplying water to the drainage layer.

As can be seen from FIG. 2, normal corner elements 4.6 and "jutting-in" corner elements 4.7 are also provided in addition to straight edging elements 4.5. Of course, corner elements other than the 90° corner elements shown may also be employed, for example arcuate elements, in order to be able to produce practically any desired circumferential shape for the border of the bed. It is important that the foot section, designated 4.2 in the case of element 4 in FIGS. 1 and 3, always faces the contents of the bed.

In order to avoid undesirable loss of water from the garden installation and in order to protect the underlying support (i.e., the roof covering 3 and the insulating layer 2 in the embodiment shown in FIG. 1) against penetration of roots and hence against destruction, a separating layer 11 is provided which is laid over the entire bed surface and is passed upwards against the inside limbs 4.1 of the edging elements so that its upper edge is reliably located above the maximum adjustable water level 12. The separating layer 11 is appropriately a sealing film of rot-proof, root-repellant material, for example a plastics film of appropriate thickness, to avoid perforation by small sharp stones or the like.

A drainage layer 13 which also serves as a water storage layer is provided above the separating layer 11. The drainage layer 13 consists of a porous material such as expanded clay, which depending on the desired storage capacity is used in particle sizes of 3–20 mm. Open-pore aerated concrete, for example in the form of individually moulded sheets of 6–20 cm thickness and completely covering the bed area, is also suitable for use as a drainage layer. As a result of the capillary action which occurs in the pores, the water level which, as shown in FIG. 1, extends to about half the height of the drainage layer, is lifted into the overlying substrate material 15.

The drainage layer is preferably connected to a device generally designated by the numeral 14 which, as shown in FIG. 1 and 2, is surrounded by a jacket pipe 17 extending approximately to the height of the substrate 15 and closed by the insulated lid 16. Inside the jacket pipe 17 is a vertically adjustable standpipe 18 which is inserted, with a sliding leakproof fit, in the upper end of a drainage pipeline 19. The height of the upper end of the standpipe 18 determines the uppermost level of the water standing in the garden installation or in the individual bed.

In the installation shown, which has fully-automatic watering, a fresh water inlet with a float-controlled valve 21 at the end of an inlet pipeline 22 is provided inside the jacket pipe 17. Other types of control of the supply of fresh water can also be used, such as, for example, electrode controls or capacitative controls. In order to ensure as uniform a distribution as possible of the water level in the drainage layer 13 the latter is provided, as shown in FIG. 2, with a number of water collecting and distributing pipelines 23 which are all connected to the interior of the device 14. As can be seen in FIG. 1, the cross-section of these collecting and distributing pipelines is approximately semi-circular.

A filter element is provided above the drainage layer 13 and separates the drainage layer 13 from the substrate 15 and prevents clogging of the drainage layer. The filter element 24 is preferably polyurethane foam in an elastic, practically rot-proof quality with open pores, in order to exert a capillary action on the water rising from the drainage layer 13 below it and to pass this water into the overlying substrate 15. However, the filter element also serves to remove excess water from the substrate into the drainage layer, in a purified state. If a polyurethane foam (polyether) is used, a layer thickness of approximately 10 mm has proved suitable.

In order to achieve the initially mentioned aim of providing a garden installation of low weight, the substrate 15 should have as small a thickness as possible. The material of the substrate 15 must therefore be distinguished by high water capacity, nutrient capacity and air capacity. The nutrient capacity and water retention capacity can be achieved by using fibrous peat litter which has been well frozen and clay particles (loess). To achieve lasting air capacity when the material is extensively walked on, for example, when the garden installation is used as a sports ground, playground and the like, up to 25% of expanded clay is appropriately mixed into the substrate. The same is true when planting with xerophytes (plants from dry regions). For peat-loving plants, a peat substrate is used.

As previously mentioned, the garden installation according to the invention is not limited to installations comprising semi-automatic or fully-automatic watering devices. It is also very advantageous in the case of normal surface watering due to the considerable reduction in material and hence in weight compared with conventional garden installations, for which reasons it is particularly suitable for roof garden installations.

What is claimed is:

1. A garden installation comprising, in combination, a bed defined by a border of a plurality of adjoining hollow edging elements, each edging element being a unit of inverted U-shaped cross-section the open side of which, in its assembled position, faces downwardly, the limb which faces the contents of the bed being provided with a foot section which extends under the contents of the bed and the facing internal surfaces of the limbs being provided with at least one pair of mutually opposite guide elements for the reception of transverse partitions, an underlying support supporting the edging elements, a separating layer disposed on said underlying support, said separating layer being a sheet which separates the contents of the bed from the underlying support, a drainage layer of water-storing material provided on the separating layer for regulating watering of the bed, a filter element disposed as a layer on the drainage layer, and a substrate located above the filter layer for receiving plants and/or seeds.

2. A garden installation comprising, in combination, a bed defined by a border of a plurality of adjoining hollow edging elements, each edging element being a unit of inverted U-shaped cross-section the open side of which, in its assembled position, faces downwardly, the limb which faces the contents of the bed being provided with a foot section which extends under the contents of the bed, and the limbs being joined by a strip provided with orifices, an underlying support supporting the edging elements, a separating layer disposed on said underlying support, said separating layer being a sheet which separates the contents of the bed from the underlying support, a drainage layer of water-storing material provided on the separating layer for regulating watering of the bed, a filter element disposed as a layer on the drainage layer, and a substrate located above the filter layer for receiving plants and/or seeds.

3. A garden installation comprising, in combination, a bed defined by a border of a plurality of adjoining hollow edging elements, each edging element being a unit of inverted U-shaped cross-section the open side of which, in its assembled position, faces downwardly, the limb which faces the contents of the bed being provided with a foot section which extends under the contents of the bed, an underlying support supporting the edging elements, a separating layer disposed on said underlying support, said separating layer being a protective film extending over the area of the bed and which passes upwardly against the limbs of the edging elements which face the contents of the bed to separate the contents of the bed from the underlying support, a drainage layer of water-storing material provided on the separating layer for regulating watering of the bed, a filter element disposed as a layer on the drainage layer, and a substrate located above the filter layer for receiving plants and/or seeds.

* * * * *